United States Patent

Klees

Patent Number: 5,463,866
Date of Patent: Nov. 7, 1995

[54] SUPERSONIC JET ENGINE INSTALLATION AND METHOD WITH SOUND SUPPRESSING NOZZLE

[75] Inventor: Garry W. Klees, Mercer Island, Wash.

[73] Assignee: The Boeing Company, Seattle, Wash.

[21] Appl. No.: 175,965

[22] Filed: Dec. 30, 1993

[51] Int. Cl.⁶ .................................................. F02K 3/02
[52] U.S. Cl. ............................... 60/204; 60/242; 60/262; 239/265.17
[58] Field of Search .......................... 60/262, 271, 242, 60/264, 226.1, 204; 181/215, 216, 219, 220; 239/265.13, 265.17, 265.19

[56] References Cited

U.S. PATENT DOCUMENTS

| | | |
|---|---|---|
| 2,931,169 | 4/1960 | Glenn . |
| 2,987,879 | 6/1961 | Brown . |
| 3,161,257 | 12/1964 | Young . |
| 3,352,494 | 11/1967 | Colville et al. . |
| 3,650,348 | 3/1972 | Colebrook et al. ............ 181/215 |
| 3,667,680 | 6/1972 | Weed ............................... 181/215 |
| 3,780,827 | 12/1973 | Straight . |
| 3,820,626 | 6/1974 | Bonneaud et al. . |
| 3,910,375 | 10/1975 | Hache et al. . |
| 4,290,262 | 9/1981 | Wynosky et al. ............... 60/262 |
| 4,294,068 | 10/1981 | Klees .............................. 60/204 |
| 4,794,924 | 7/1988 | Shannon ...................... 239/265.13 |
| 5,157,916 | 10/1992 | Wynosky et al. ............... 60/204 |
| 5,216,878 | 6/1993 | Klees .............................. 60/204 |
| 5,222,359 | 6/1993 | Klees et al. .................... 60/226.1 |
| 5,261,229 | 11/1993 | Ford et al. ...................... 60/262 |
| 5,269,139 | 12/1993 | Klees .............................. 60/262 |
| 5,351,480 | 10/1994 | Kretschmer ................. 239/265.17 |

OTHER PUBLICATIONS

Pearson, *Journal Of The Royal Aeronautical Society*, V.62, No. 573 Sep., 1958., p. 662.

Primary Examiner—Timothy S. Thorpe
Attorney, Agent, or Firm—Hughes, Multer & Schacht

[57] ABSTRACT

A supersonic jet engine having a nozzle section into which ambient air can be selectively introduced for a noise suppressing mode of operation, with this ambient air being intermixed with engine exhaust flow, through passageway segments. Flow modulating plugs or vanes are positioned at the exhaust end of engine exhaust outlet segments in a mixing section, and these are operated during noise suppression mode to match engine requirements. There is a final nozzle section which during the noise suppressing mode is opened to present a relatively large cross sectional flow area to accommodate the mixed flow.

During the non-noise suppressing mode, the final nozzle has a convergent/divergent configuration to control flow, and the plug or vane flow modulating means are positioned to permit unrestricted flow from the engine exhaust outlet segments.

20 Claims, 5 Drawing Sheets

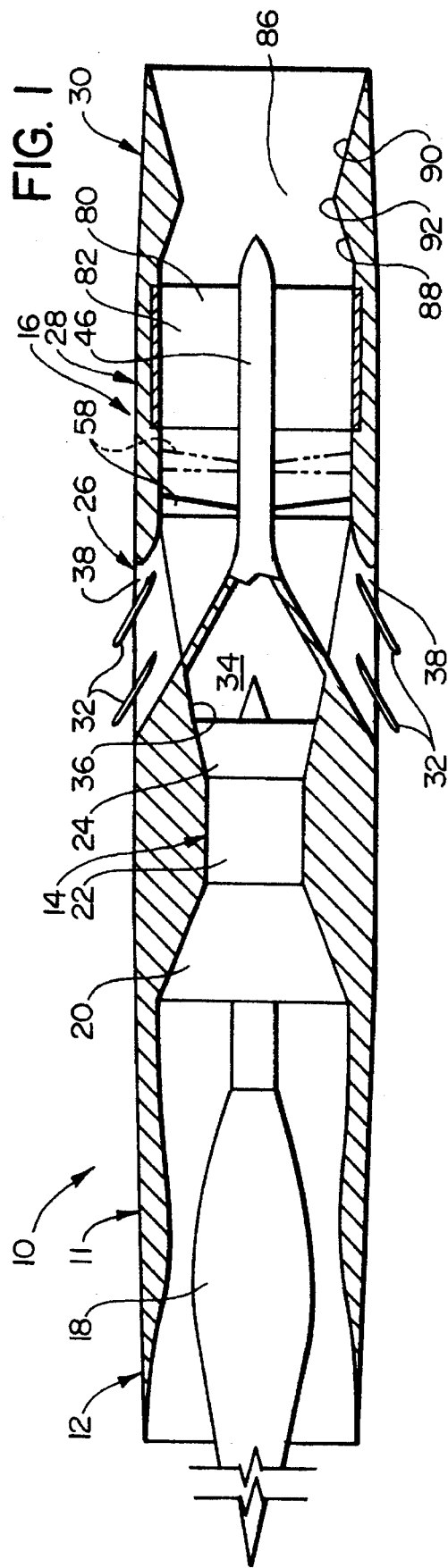
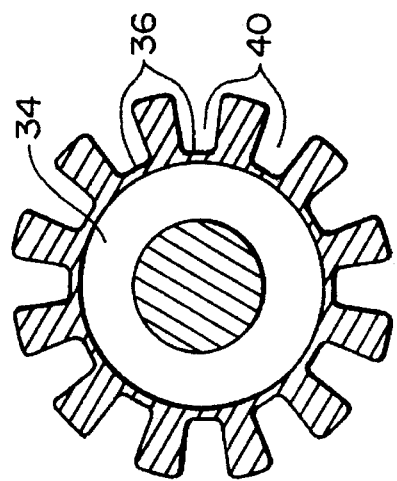
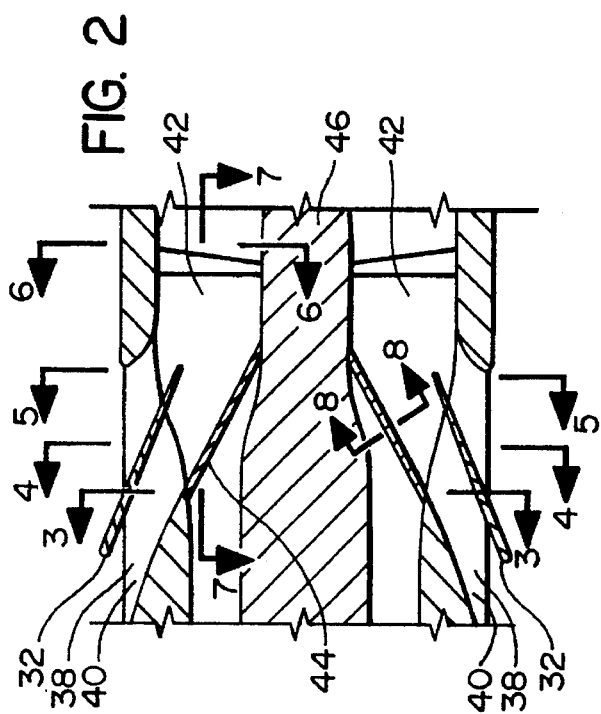
FIG. 1
FIG. 2
FIG. 3

SUPERSONIC JET ENGINE INSTALLATION AND METHOD WITH SOUND SUPPRESSING NOZZLE

FIELD OF THE INVENTION

The present invention relates to a supersonic jet engine installation or assembly having a noise suppressing nozzle and a method for the same, and more particularly to such an engine which in a sound suppressing mode mixes ambient air with engine exhaust for noise suppression.

BACKGROUND OF THE INVENTION

The design of engines that travel at supersonic speeds (e.g. possibly in the range of Mach 2 to Mach 3 at cruise, or possibly higher) involves a number of problems similar to those encountered in the design of subsonic jet engines. For both supersonic and subsonic engines, there are the generally concerns regarding weight, size, complexity, reliability, cost, etc., and also concerns relative to performance (e.g. thrust, specific fuel consumption, etc.). However, supersonic jet engines pose some special problems. More particularly, present date optimized designs for supersonic turbo-jet type engines are characterized in that these have relatively high jet velocities, and thus create a high level of noise. Noise suppression in this type of engine is one of the most critical technical problems to be solved in making an environmentally acceptable commercial supersonic jet transport. Another consideration is that the supersonic jet engine must be designed to function adequately through a broad range of operating modes (i.e. take-off and climb, acceleration up to supersonic cruise Mach number, as well as being able to cruise at both subsonic and supersonic speeds).

With regard to noise suppression, in the last several decades, there have been many different systems proposed and/or used for suppressing noise. One general approach has been to mix the higher velocity jet exhaust with lower velocity air, and there are many patents and other technical disclosures relating to variations of this basic concept. Further, there is use of noise suppressing structural materials, along with the use of panels deployed in the gaseous outflow path from the engine. However, quite commonly, these noise suppressing devices will degrade performance for modes of operation (e.g. supersonic cruise) not requiring this degree of noise suppression.

A search of the patent literature has disclosed a number of patents, and these are given below:

Hache et al U.S. Pat. No. 3,910,375 discloses what is called a "jet engine silencer" where there is an ambient air induction system which feeds into the center body of the engine. Within the center body there are chutes which are normally stowed, and for suppressor operation they are deployed so that these emit the ambient air with the primary exhaust to create more rapid mixing. The actual mixing occurs aft of the exit plane of the nozzle.

Bonncaud et al U.S. Pat. No. 3,820,626 discloses what can be referred to as a "spade-type" sound suppressor. For noise suppression, members are moved into the exhaust stream to create obstructions and turbulence in the stream to enhance mixing of the exhaust stream with ambient air at a location aft of the nozzle.

Straight U.S. U.S. Pat. No. 3,780,827 shows an exhaust nozzle where there are hollow struts which carry air into a sting at the center of the engine. This air in the sting exits at the nozzle location, serving as a low velocity inner core of secondary air to provide noise reduction.

Colville et al U.S. Pat. No. 3,352,494 shows what is called a supersonic jet propulsion nozzle. This has a collapsing center body plug nozzle with a translating shroud. Noise suppression is obtained by deploying flap members 52 into he gaseous exhaust to promote mixing with ambient air.

Young U.S. Pat. No. 3,161,257 discloses a nozzle silencing system which deploys elements into the air stream to cause a swirling motion, and thus cause mixing with ambient air at a location aft of the nozzle end opening.

Brown U.S. Pat. No. 2,987,879 discloses a co-annular nozzle where ambient air is taken in through radially extending struts to the center body of the engine. Then for noise suppression, this air is moved into the middle portion of the exhaust stream to increase the diameter of the jet stream so that it mixes more quickly with the outside air. This achieves its noise reduction by what is sometimes called a "co-annular" reduction benefit.

Glenn U.S. Pat. No. 2,931,169 discloses what is called a "variable convergent/divergent exhaust nozzle" which is intended to lower drag and improve the thrust of the nozzle over a wide flight regime from subsonic to supersonic, and has been used in supersonic jet fighter aircraft over a number of years. This does provide a noise reduction benefit to some extent since the air enters through an ejector and mixes with the primary nozzle. This essentially comprises an annular ring of air which flows around the main primary exhaust.

SUMMARY OF THE INVENTION

The supersonic jet engine assembly of the present invention is arranged to operate in a mixed flow, noise suppressing mode where ambient air is mixed with engine exhaust for noise suppression, and to operate in a substantially non-mixed flow mode.

This assembly comprises a nacelle having an inlet end and an outlet end. There is a jet engine positioned in the nacelle to receive air through the air inlet end and discharge gaseous exhaust from an outlet end of said engine.

There is a nozzle section positioned to receive the gaseous exhaust from the engine. This nozzle section comprises a selectively operably ambient air door means which has an open position to admit ambient air into the nozzle section, and a closed position. Also, there is a passageway mixing section comprising passageway defining wall means having an inlet portion to receive the gaseous exhaust from the engine and also to receive the ambient air through opening means provided by the ambient air door means. The passageway mixing section defines a plurality of engine exhaust outlet segments and a plurality of ambient air outlet segments, these being interspersed with respect to one another. The passageway mixing section has a transition portion to direct engine exhaust into the engine exhaust outlet segments and to direct the ambient air into the ambient air discharge segments.

There is means defining a mixing chamber positioned downstream of the passageway mixing section to receive gaseous exhaust flow from the gaseous exhaust outlet segments and also to receive ambient air flow from the ambient air outlet segments. Mixing occurs in the mixing chamber when there is flow of both gaseous engine exhaust and ambient air into the mixing chamber.

There is a variable area final nozzle portion arranged to be configured in a convergent/divergent configuration to receive gaseous flow from said mixing chamber at subsonic velocity and discharge said gaseous flow at supersonic velocity. Also, the final nozzle portion is arranged to be configured with a greater nozzle area.

There is engine exhaust outlet segment modulating means having:

i. a first noise suppressing modulating mode where the modulating means is positioned to provide a convergent/divergent outlet area of the engine exhaust outlet segments, and to increase and decrease the outlet area to match engine requirements during a noise suppressing mode, where ambient air is directed into the mixing chamber, ii. a second open operating mode where the engine exhaust modulating means is positioned to permit substantially unrestricted flow from said engine exhaust outlet segments.

Thus, during a non-noise suppressing mode, engine exhaust flow into the mixing area is subsonic, and the final nozzle portion is operated in said convergent/divergent configuration to cause discharge of said gaseous engine exhaust at supersonic velocities. During the noise suppressing mode, the engine exhaust outlet segment modulating means is operated to modulate flow through the engine exhaust outlet segments in a manner to increase and decrease outlet are at the engine exhaust outlet segments to match engine requirements. Also, the door means is open to admit ambient air into the mixing chamber to be mixed with the engine exhaust for noise suppression.

In one form, the engine exhaust segment modulating means comprises a plurality of plug elements positioned at respective exhaust outlet segments to define with the passageway defining wall means convergent/divergent outlet areas for said engine exhaust outlet segments for the first noise suppressing modulating mode. There is means to modify the relative position of the plug elements and the wall means to increase or decrease the outlet areas for the engine exhaust outlet segments and also to position the plug elements to be spaced from said engine exhaust segments for said second open operating mode. In one arrangement, the plug elements are positioned to be moveable axially relative to the wall means generally along a longitudinal axis of the engine. In another arrangement, the plug elements are arranged to be moved angularly relative to the nacelle, and also to be moveable in a manner to be stowed in the nacelle.

Also, in a preferred form there are noise suppressing panel means positioned in the mixing chamber. In a specific arrangement, there is a plurality of noise suppressing panel means, each of which panel means is positioned behind, and aligned with, a flow path of ambient air admitted downstream from said ambient air outlet segments.

In another arrangement of the engine exhaust outlet segment modulating means, there is a plurality of vane means, each of which is mounted adjacent to a related one of said engine exhaust outlet segments. Each of the vane means has surface means defining a passageway for engine exhaust through said engine exhaust outlet segments. Each of the vane means is positioned to define the convergent/divergent outlet area of the engine exhaust outlet segments and moveable to vary outlet area of the engine exhaust outlet segments. Desirably, each of said vane means comprises a pair of vanes positioned at a downstream end of the passageway defining wall means, with each pair of vanes being moveable toward and away from one another to vary the outlet area of the engine exhaust outlet segments, and moveable further away from one another to permit the substantially unrestricted flow from the engine exhaust segments.

In a further embodiment, at least the rear portion of the nozzle section has a generally rectangular configuration, and the final nozzle portion comprises opposed nozzle sections, rear ends of which are moveable toward and away from one another. Desirably, the opposed nozzle sections have inwardly facing surface portions which are moveable to be contoured in a convergent/divergent configuration, and also moveable to further outward positions to present an increased exhaust area for the noise suppressing mode.

Also, the nozzle sections are arranged to be moved toward one another to block the final nozzle. Thrust reverser means are positioned forwardly of the final nozzle and are operable to move to an open position to divert engine exhaust from within the nacelle outwardly and forwardly for thrust reversal.

In the method of the present invention, the engine assembly as described above is utilized. For the noise suppressing mode of operation, the door means are open to admit ambient air, which flows into the passageway mixing section and out the ambient air discharge sediments into the mixing chamber. At the same time, the engine exhaust is directed into the nozzle section and flows out the engine exhaust outlet segments into the mixing chamber. The ambient air and the engine exhaust mix in the mixing chamber to accomplish noise suppression, with this mixed flow then passing out the final nozzle which is opened to accommodate the volume of the mixed flow. Also, the engine exhaust outlet segment modulating means is operated in the first noise suppressing modulating mode where it provides a convergent/divergent outlet area for the engine exhaust outlet segments. The modulating means is controlled to increase and decrease the outlet area of the engine exhaust outlet segments to match engine requirements.

In the non-noise suppressing mode, the door means is closed to substantially exclude ambient air. Also, the engine outlet modulating means is moved to the open operating mode where there is substantially unrestricted flow from the engine exhaust outlet segments. Also, the final nozzle is arranged in its convergent/divergent configuration to receive the gaseous flow from the mixing chamber at subsonic velocity and discharge the gaseous flow at supersonic velocity. With the flow in the mixing chamber being at a lower subsonic velocity, the effect of creating losses by the presence of the sound suppressing panel means is diminished.

Other features of the present invention will become apparent from the following detailed description.

BRIEF DESCRIPTIONS OF THE DRAWINGS

FIG. 1 is a longitudinal sectional view showing a first embodiment of the supersonic jet engine of the present invention, with the ambient air inlet doors shown in the open position for the sound suppressing mode;

FIG. 2 is a longitudinal sectional view similar to FIG. 1, but showing only the nozzle section of the engine of FIG. 1, and drawn to an enlarged scale;

Figure 9:
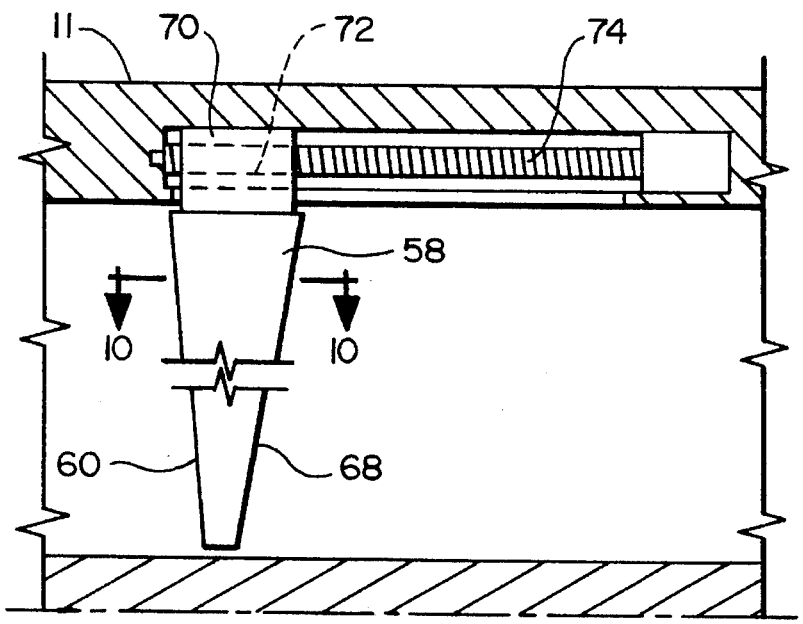
Figure 10:
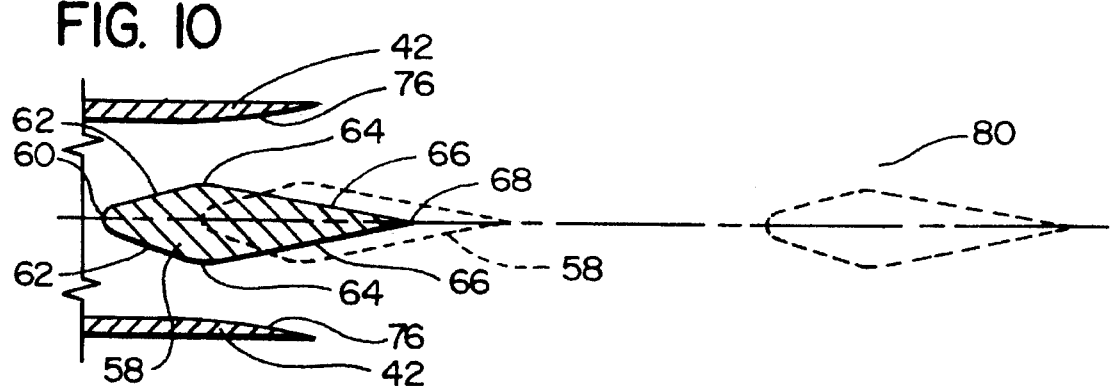
Figure 11:
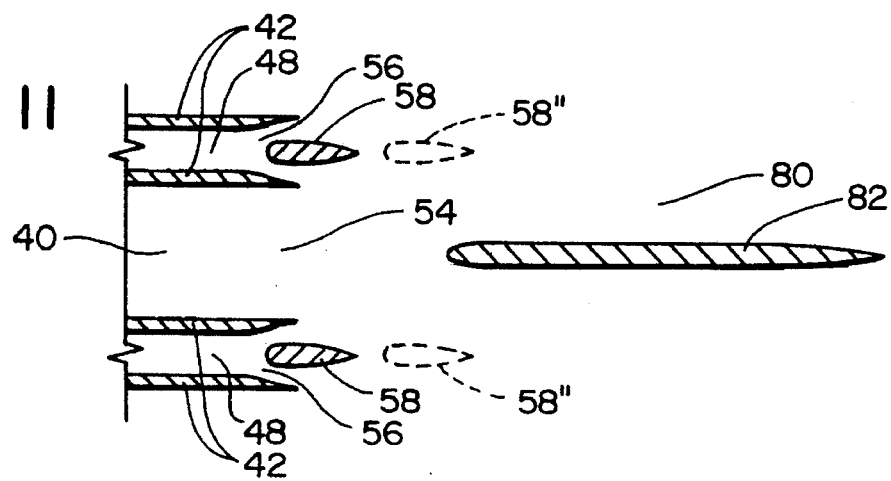
Figure 12:
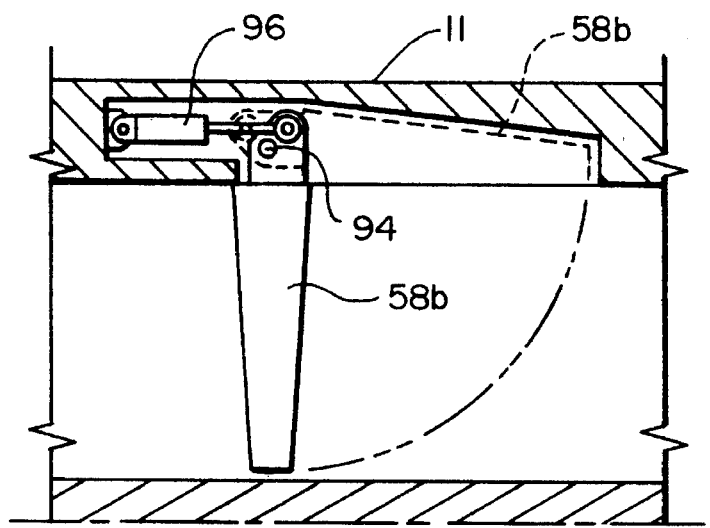
Figure 13:
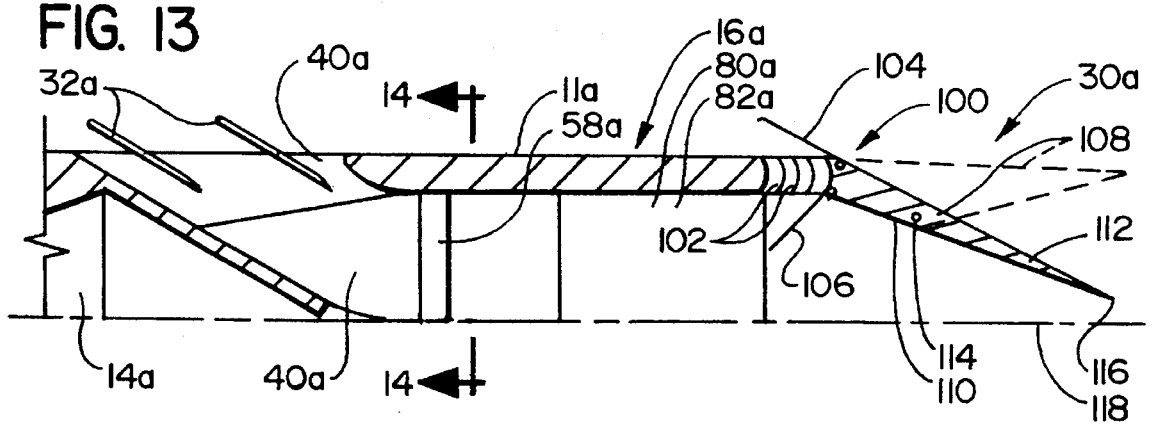
Figure 14:
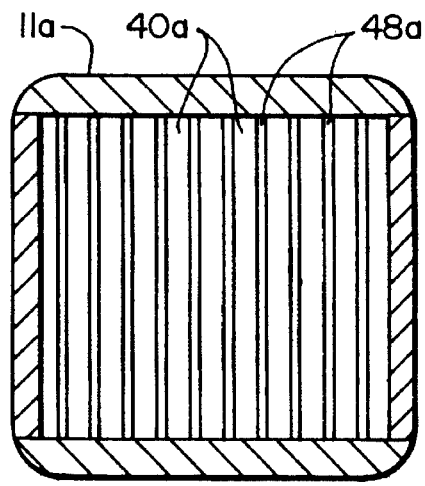
Figure 15A:
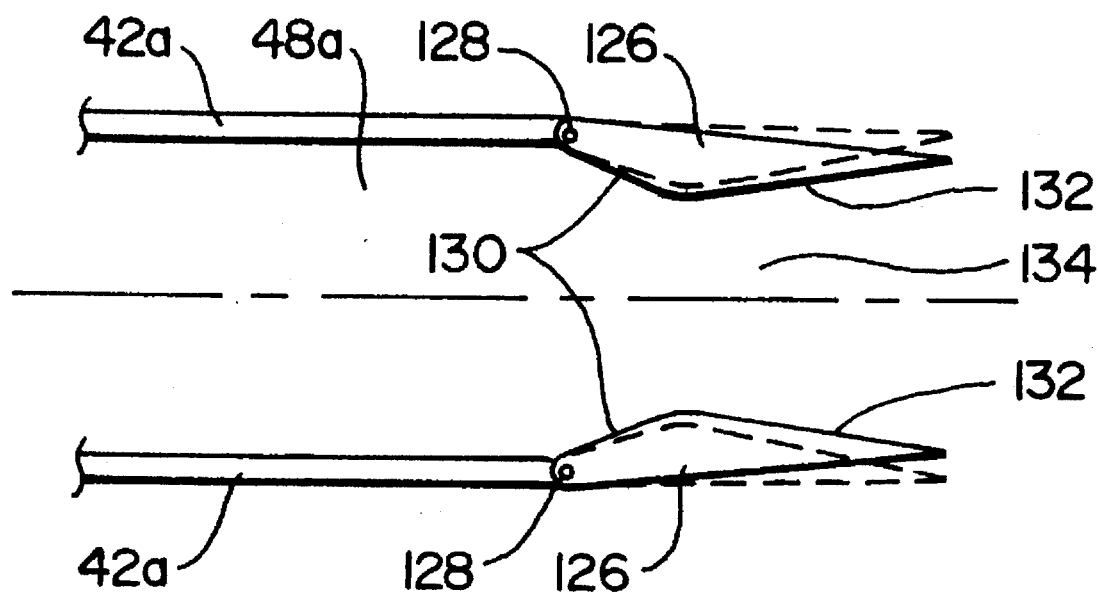
Figure 15B:
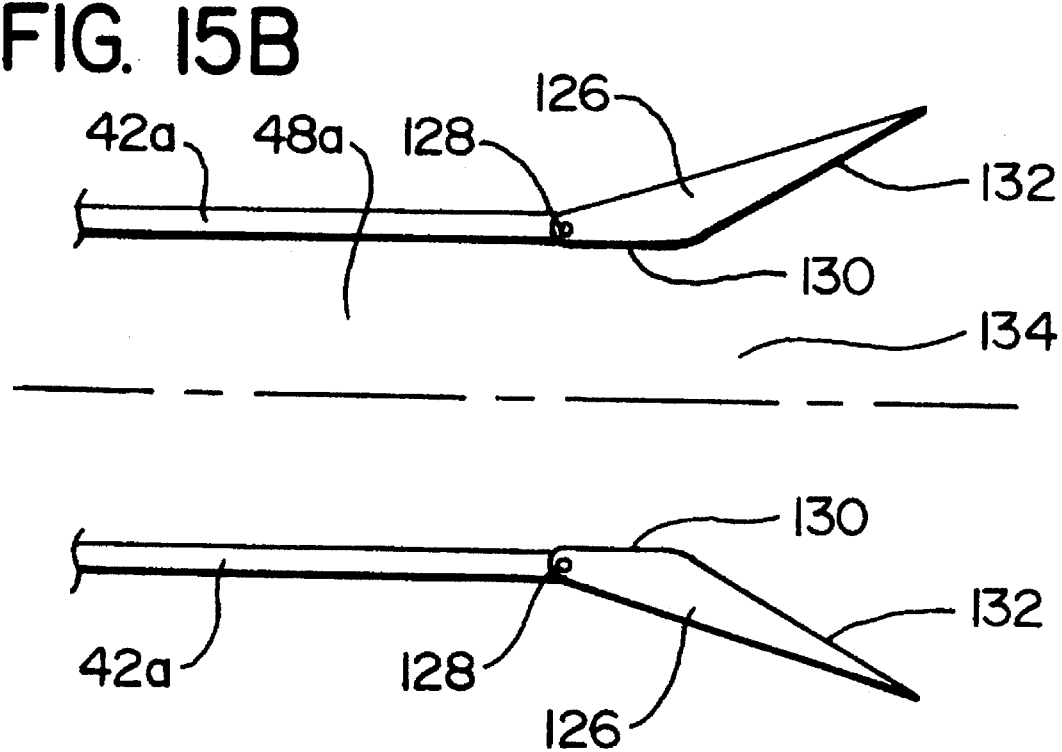

FIGS. 3 through 8 are sectional views taken at, respectively, lines 3—3, 4—4, 5—5, 6—6, 7—7 and 8—8 of FIG. 2;

FIG. 9 is a longitudinal sectional view of a portion of the nozzle section of the first embodiment, illustrating somewhat schematically the mechanism for translating the area control plug elements for the primary exhaust longitudinally;

FIG. 10 is a sectional view taken along line 10—10 of FIG. 9, showing one of the plugs in two different positions to control the throat area of one of the primary exhaust passageway segments;

FIG. 11 is a view similar to FIG. 10, but showing a pair of primary exhaust outlet segments, and also showing two related plug elements in the noise suppressing mode, and also showing these plug elements removed from the primary exhaust outlet segments for operation in the non-noise suppressing mode, and further showing positioning of noise panels in the mixing area;

FIG. 12 is a longitudinal sectional view of a portion of the nozzle, showing a modified arrangement for the plug elements of the first embodiment, where the plug elements are rotated outwardly to a stowed position to be out of the main exhaust stream;

FIG. 13 is a longitudinal sectional view showing only one half of the engine, and illustrating a second embodiment of the present invention where the nozzle section has a rectangular configuration;

FIG. 14 is a sectional view of the second embodiment of FIG. 13, taken on line 14—14 of FIG. 13; and FIG. 15a and 15b are sectional views, similar to FIG. 10 and illustrating a pair of vanes use as the nozzle modulating elements of the second embodiments, shown in FIGS. 15a with these vanes operating in the noise suppression mode, and in FIG. 15b operating in the open, non-noise suppressing mode.

DESCRIPTION OF THE PREFERRED EMBODIMENTS

In FIG. 1, there is shown somewhat schematically a supersonic jet engine installation or assembly 10 which comprises an outer annular nacelle 11, an inlet section 12, an engine 14, and a nozzle section 16. The inlet section is shown as an axisymmetric inlet which is commonly proposed for supersonic aircraft, using a translating center body 18 which can be moved longitudinally to control the inlet area. The engine 14 is or may be of conventional design, and as shown herein comprises a compressor section 20, a burner section 22 and a turbine section 24. This engine 14 may be a conventional turbo-jet or turbo-fan engine, and is shown herein as a turbo-jet engine. The nozzle section 16 comprises a forward mixing passageway section 26 (shown in FIG. 2), an intermediate mixing chamber section 28, and a final nozzle section 30.

The passageway section 26 has a plurality of inlet doors 32 arranged around the exterior of the nacelle 11. There may be two or more circumferential sets of these doors 32, spaced axially from one another. In the closed position, these doors 32 are flush with the outer surface of the nacelle 11, and when these doors 32 are deployed inwardly, they admit ambient air to flow into the ambient air passageway provided by the passageway section 26.

Figure 7:
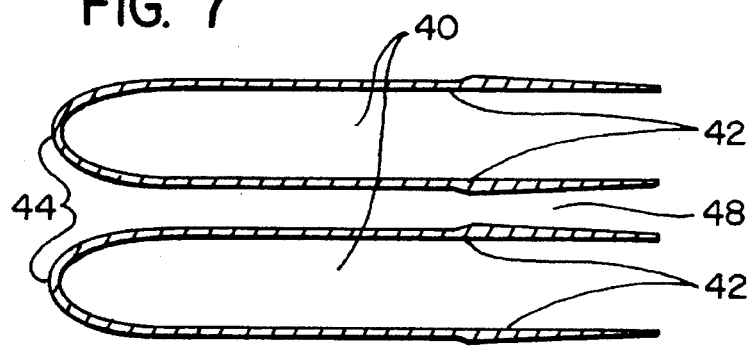
Figure 8:
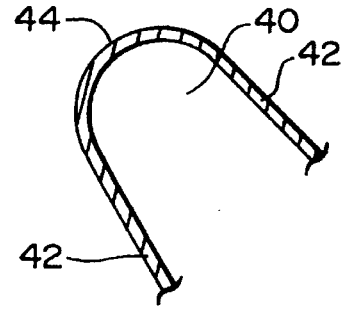

To describe the structure of the passageway mixing section, reference is made to FIGS. 2 through 8. The exhaust from the turbine section 24 flows into an annular passageway portion 34 defined by a surrounding wall portion 36. Radially outwardly from this passageway portion 34 is a plurality of forward nacelle inlets 38 for a plurality of ambient air inlet passageways 40. These air inlet passageways 40 are at evenly spaced circumferential locations around the nozzle section 16, and extend rearwardly and radially inwardly. In cross section, as can be seen in FIGS. 7 and 8, these passageways 40 have a U shaped configuration and comprise two radially extending side walls 42 joined by a forward semicircular curved joining section 44 which extends from an outer forward location radially inwardly and rearwardly to join to the center body 46 that is a rearward extension of the engine 14. It can be seen that each pair of side walls 42 that are joined to one another by the curved section 44 define a related ambient air passageway 40, while two adjacent passageway walls 44 of adjacent passageway defining wall structure 42–44 define a related one of the primary exhaust passageway segments 48.

Figure 4:
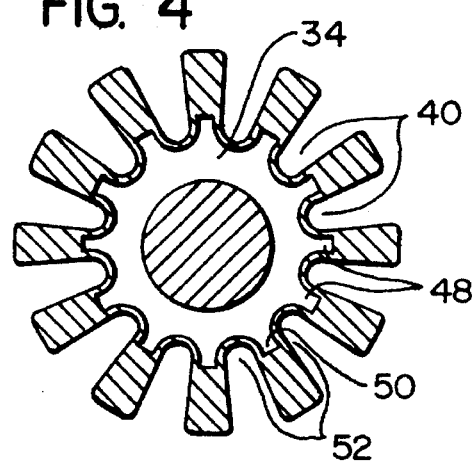
Figure 5:
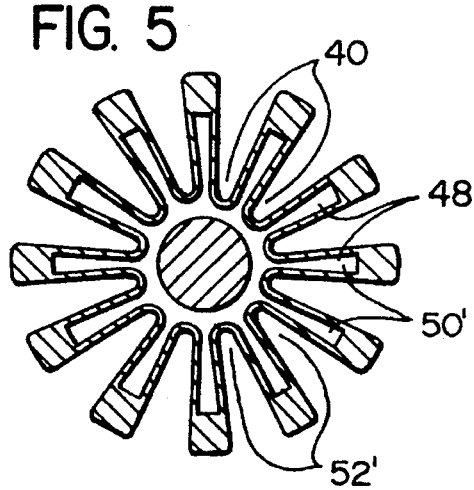
Figure 6:
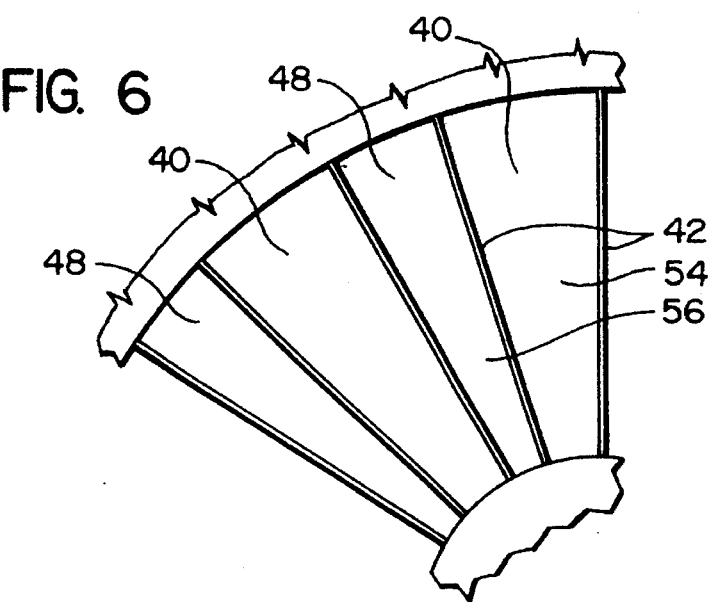

Each passageway defining wall structure 42–44 is contoured to provide for the smooth flow of both the ambient air and the engine exhaust. This can be seen more clearly with reference to FIGS. 3–6. It can be seen in FIG. 3 that the annular engine outlet passageway 34 has a circular outer containing wall 36. A short distance downstream at the location of FIG. 4—4, it can be seen that this annular passageway 34 is developing outward passageway protrusions 50 that are the initial portion of the primary engine exhaust passageways 48, and that valleys are forming at 52, these valleys 52 being the radially inward portion of the ambient air passageways 40. At a further downstream location, as shown in FIG. 5, it can be seen that these outwardly extending engine exhaust passageway portions 50 are extending further outwardly at 50' and that the valleys 52' that are the ambient air passageway portions 40 have moved further toward the center axis of the engine. Finally, when we reach a further rear location at FIG. 6, the ambient air passageways 40 and the primary engine exhaust passageway or passageway segments 48 have reached a transverse exit plane, and are end in ambient air passageway outlet segments 54 and primary engine exhaust passageway outlet segments 56.

To review briefly the operation of this passageway mixing section 26, when the inlet doors 32 are closed so that these are flush with the outer surface of the nacelle 11, the ambient air inlet passageways 40 are closed. In this mode, the primary engine exhaust simply flows through the primary exhaust passageway segments 48 and exit through the engine exhaust passageway outlet segments 56. This is the arrangement during the non-noise suppressing mode. For the noise suppressing mode, the ambient air inlet doors 32 are moved inwardly to their open, noise suppressing position, and the ambient air flows inwardly and rearwardly through the ambient air passageways 40. As this ambient air flows rearwardly and radially inwardly, it is shaped by the wall sections 42–44 into pie-shaped segments having generally pie-shaped outlet configurations at the air outlet segments 54. In like manner, the engine exhaust is directed into the primary engine exhaust passageways 48 to exit through a plurality of pie-shaped engine exhaust passageway outlet segments 56.

There is positioned at each engine exhaust passageway outlet segment an outlet area modulating plug element 58. AS will be described further in this text, these plug elements 58 collectively define an engine exhaust modulating means which during the noise suppressing mode provide the changes in engine exhaust passageway area as required by the engine 14. Then in the non-noise suppressing mode (e.g. at supersonic cruise or other operating modes where noise suppression is not required), these plug elements are moved to a location spaced from the engine exhaust passageway outlet segments 56 to provide substantially the full flow area out the engine exhaust passageways 48. This particular arrangement in combination with the other components of the present invention is considered particularly significant and will be discussed more completely later in this text.

With reference to FIGS. 9 and 10, it can be seen that each plug element 58 has, in cross sectional configuration (see FIG. 10) an aerodynamically contoured shape, with a nose portion 60, two forward surface portions 62 that slant rearwardly and divergently to an intermediate portion 64 of maximum width, and two rearwardly extending converging portions 66 that meet at a trailing edge 68. As can be seen in FIG. 9, the nose portion 60 and trailing edge portion 68 taper toward one another in a radially inward direction. At the same time, the width dimension of each plug element 58 is reduced accordingly to maintain the same relative aerodynamic contour at all locations along the length of the plug element 58.

Each plug element 58 is connected at its radially outward end to a mounting ring 70 that is positioned in the nacelle 11 for the movement longitudinally. In this particular arrangement, this is accomplished by providing the ring 70 with threaded sockets 72 which in turn engage several screw drive elements 74 positioned at several spaced locations around the circumference of the nacelle 11.

In FIG. 10, one of the plug elements 58 is shown in the modulating, noise suppressing mode, positioned in the engine exhaust outlet defined by two adjacent walls 42. It will be noted that the rear oppositely facing surface portions of the rear end of the two adjacent walls 42 that define the passageway outlet segment 48 slant away from each other in a rearwardly direction, thus defining a rearwardly diverging engine exhaust passageway. When the plug element 58 is in a more forward position (illustrated in solid lines of FIG. 10), the intermediate maximum width portion 64 of the plug element 68 is aligned with the forward portions of the tapering passageway portions 76, and thus forms a throat of smaller area. When the plug element 58 is moved rearwardly to the broken line position of FIG. 10, it can be seen that the passageway area of the engine outlet segment 56 increases.

Thus, the plug elements 58 can be moved axially at a location within (or closely adjacent to) its adjacent engine outlet passageway segment 56 to vary the effective passageway area to properly match the requirements of the engine 14. For example, if, during the noise suppression mode, the engine 14 is at a higher power setting, thus operating at higher compression ratios and having somewhat lower volumetric flow, the plug element 58 would be moved to the more forward solid line position of FIG. 10. On the other hand, on the lower power setting where there is greater volumetric flow, the plug elements 58 would likely be moved to a further rearward location, thus opening up the throat area.

Obviously, the precise surface contouring and dimensioning of the plug element 58 could be refined to optimize performance. For example, instead of tapering the plug element 58 uniformly relative to its length and width dimension and cross sectional configuration it may be desired to leave the length dimension closer to being uniform, and simply taper the width dimension inwardly. In like manner, the two rear tapering wall portions 76 could be configured somewhat differently to better match the contour of the plug element 58 along its length.

As indicated previously, the plug elements 58 have a non-noise suppressing mode where these are moved totally out of the location of the related engine exhaust outlet segments 48. This is shown in FIGS. 10 and 11. In FIG. 11, there are shown two pairs of adjacent passageway defining walls 42, defining two engine exhaust passageways 48, each having outlets 56, and an ambient air passageway segment 40, having an outlet passageway segment 54. The two plug elements 58 are shown at 58" at the engine exhaust outlet segments 56, and are shown at 58' at a further rearward location where these are well behind the engine exhaust outlet segments 56. Thus, it can be seen, that at this further rearward location (shown at 58"), the flow out the engine exhaust passageways 48 is substantially unobstructed by the plug elements 58.

It will also be noted that in the mixing chamber 80 defined by the mixing chamber section 28 of the nozzle section 16, there is one of a plurality of noise suppressing panel 82. As shown in FIG. 11, this panel 82 is positioned a moderate distant downstream from the ambient air outlet 54 for the related ambient air passageway 40, and is aligned with, and centered on, its related ambient air passageway 40. Thus, there is ambient air flow on both sides of each noise suppressing panel 82, with engine exhaust flow also being on both sides of the panel 82. It is to be understood, of course, there is a plurality of such panels 82 positioned circumferentially entirely around the mixing chamber 80, with these panels 82 extending radially outwardly from the center line of the engine assembly 10.

The final nozzle section 30 is a variable area nozzle and can be positioned to form a converging/diverging nozzle area 86, this comprising the forward converging surface portion 88, and a rear diverging surface portion 90, these meeting at the throat area 92. The particular manner in which the surface contour of the final nozzle section 28 and its throat area is varied can (or may be) accomplished in accordance with methods and apparatus already known in the prior art. Also the final nozzle area can be opened up to have a larger cross sectional flow area without the converging/diverging throat area. Further, the exit area of the final nozzle can be changed to optimize performance.

To describe the operation of the present invention, first, the overall operation of the jet engine assembly 10 in the non-noise suppressing mode will first be reviewed. The ambient air enters the nacelle 11 through the inlet section 12 to be compressed in the compressor section 20, with the compressed air passing into the burner section 22 where fuel in introduced. The combustion gas and air passes into the turbine 24 and into the engine exhaust passageway segments 48 to pass out the engine exhaust outlet segments 56. In this mode, the plug elements 58 are moved to their further rearward position to leave the engine exhaust outlet segments 56 unobstructed. The engine exhaust then passes into the mixing chamber 80, where it is still subsonic (e.g. Mach 0.2 to Mach 0.4). At this speed, the sudden expansion loss for the resulting area jump (e.g. possibly a 3 to 1 area jump) would be a relatively small amount (e.g. one percent of total pressure, which is a relatively small thrust loss because of the high nozzle pressure ratios).

Also at this low speed the losses resulting from the presence of the noise suppressing panels 82 would be relatively low. Then when the engine exhaust passes through the final nozzle, the final nozzle 30 is in its convergent/divergent configuration, so that the flow reaches supersonic speed as it moves through the throat area 92 and exits from the engine as supersonic exhaust.

Now let it be assumed that the engine assembly 10 is operating where there are strict noise requirements, so that noise suppression is required (e.g. take-off and early climb, depending upon the surrounding environment). In this operating mode, the ambient air inlet doors 32 and moved to the open position, and ambient air flows into and through the passageways 40 to exit out the ambient air outlets 54 into the mixing chamber 80. At the same time, the engine exhaust is exiting from the engine exhaust outlet segments 56, with the engine exhaust and the ambient air mixing in the chamber 80. In this mode the plug elements 58 are each positioned at the more forward location in their respective engine exhaust outlet opening segments 56. This chokes the flow of the engine exhaust to cause it to go supersonic (or at least sonic) as it passes outwardly from the outlet segments 56. In this mode the final nozzle section 30 would normally be at or near its full open position to accommodate the combined mix flow or the engine exhaust and the ambient air from the mixing chamber 80.

The final nozzle section 30 must provide (in the non-noise suppressing mode) for the same degree of throat area modulation as is provided by the plug elements 58 in the noise suppressing mode. Also in the noise suppressing mode, the final nozzle section 30 must also be capable of passing the total mixed exhaust flow during the suppression mode. This means that the final nozzle section must be able to provide a minimum outlet area that is as low as less than a quarter of the maximum outlet area. Accordingly, this may cause complications that would make a circular exhaust nozzle impractical. For this reason, a two dimensional nozzle may be a preferred embodiment, and this will be described subsequently herein as a second embodiment, which is shown in FIGS. 13 through 15A and 15B.

Also, it is understood that the engine assembly 10 would be provided with a suitable thrust reverser. Since such thrust reversers which would be suitable for use in this first embodiment (possibly in some modified form) are known in the prior art, these will not be described herein.

A modified form of the plug elements 58 of the present invention is shown in FIG. 12. Since the other components of the first embodiment remain substantially the same, except for this modification shown in FIG. 12, only one plug element is shown, for ease of illustration, this being designated 58b.

Instead of being mounted for axial travel, these plug elements 58b are mounted at a respective pivot location 94 in the nacelle 11. A suitable actuating means, indicated schematically at 96 simply rotates the plug element 58' about the pivot axis 94.

In the modulating, noise suppressing mode, the limited angular movement of each of the plug elements 58b is controlled, relative to its position at the engine exhaust outlet segments 56, so that the plug elements 58b properly control the engine exhaust flow. However, in the non-noise suppressing mode, the plug elements 58b are simply rotated radially outwardly into a stowed position within the nacelle 11, thus substantially eliminating these plug elements 58b as a source of drag during the non-noise suppressing mode of operation.

A second embodiment of the present invention is shown in FIGS. 13, 14, 15A and 15B. Components of the second embodiment which are similar to components of the first embodiment will be given like numerical designations, with an "a" suffix distinguishing those of the second embodiment. This second embodiment is substantially similar to the first embodiment, except that the nozzle section 16a has a rectangular configuration to provide this as a two-dimensional nozzle. The engine components forward of the nozzle section 16a are or may be similar to (or the same as) the components shown of the first embodiment. Since it is well understood in the art how the main components of an axisymmetric jet engine can be modified to the two dimensional configuration, it is believed not to be necessary to describe the corresponding components of the second embodiment in detail. For ease of illustration only the upper half of the engine assembly 10a is shown in FIG. 13.

As in the first embodiment, there is a plurality of inlet doors 32a, and these are located at upper and lower nacelle surfaces of the forward part of the nozzle section 16a. The primary exhaust from the engine 14a flows into a plurality of parallel passageways 48a, but with the two dimensional engine configuration, with these passageway segments 48a have a uniform thickness dimension, and with the width dimension (i.e. height dimension) expanding in a downstream direction. In like manner, the ambient air inlet passageways 40a also have a uniform thickness dimension, and the width dimension (i.e. height dimension) increases in a downstream direction. Thus, as illustrated in FIG. 14, the passageway segments 40a and 48a are in an alternating pattern, with these being vertically aligned and of uniform thickness. (For ease of illustration the plugs 58a are not shown in FIG. 14.)

The plug elements 58a have a uniform cross sectional area along their entire length, and as in the first embodiment, in the noise suppressing mode these are positioned in the engine exhaust outlets which in this case are rectangular in shape. For the non-noise suppressing mode, these plug elements 58a are moved rearwardly so as to leave the engine exhaust passageway outlets 56a unobstructed.

The noise suppression panels 82a are vertically positioned and parallel with one another. Also, there is shown somewhat schematically a thrust reverser 100 which is formed as upper and lower sections. Each section comprises a set of turning vanes 102 positioned within upper and lower walls of the nacelle 11a. For each set of vanes 102, there are two flow diverting plates, namely an outer plate 104 and an inner plate 106 which are pivotally mounted at their rear ends and can rotate outwardly to provide thrust reversing paths from the mixing chamber 80a through the vanes 102 and forwardly past the outer diverting plate 104. Obviously, a similar thrust reversing arrangement is provided at the lower part of the engine assembly 10a.

The final nozzle section 30a, may of itself be of (or adapted from) conventional designs. The final nozzle section has upper and lower portions 108. Each Portion 108 comprises a forward portion 110 pivotally mounted at its forward end to the aft end of the nacelle 11a, and a rear portion 112 pivotally mounted at 114 to the rear of the forward part 110.

In the solid line position of FIG. 13, the final nozzle sections 108 are rotated inwardly so that the trailing edges 116 are close to the center line 118, in a manner that the two sections 108 (if moved together) completely close off the final nozzle flow path, this being done during thrust reversal.

Also, as is known in the prior art, the two final nozzle portions 110 and 112 can be articulated with one another to define a convergent/divergent nozzle passageway, as shown in broken lines at FIG. 13. As indicated previously in this text, since the final nozzle section 30a should have the capability of providing a full nozzle opening which could be more than four times as great as the minimum nozzle opening, this arrangement shown in FIG. 13 would be well adapted for this function.

Another modification shown in this second embodiment is illustrated with regard to FIGS. 15A and 15B. Instead of using the plug elements 58a which are indicated in FIG. 13, there is provided for each set of plates 42a a pair of vanes 126 each pivotally mounted at its forward end 128 to the rear edge of its related passageway wall 42a. The inside surface of each vane 126 (i.e. those surface facing the engine exhaust path) has a forward converging surface portion 130, and a rear diverging surface portion 132, with the surface portions 130–132 of the two vanes 126 defining a convergent/divergent passageway. It is evident that by rotating each pair of vanes 126 toward one another or away from one another, the area of the throat 134 defined by each pair of vanes 126 can be varied. This is done during noise suppressing mode.

As shown in FIG. 15B, the two vanes 126 can be rotated outwardly, so that the forward converging surface portions 130 are parallel with one another, thus eliminating the convergent/divergent passageway. This position of the vanes, as shown in FIG. 15B, is utilized for the non-noise suppressing mode where the flow of engine exhaust out the passageways 48a is subsonic.

It is believed that the mode of operation of this second embodiment is evident from reviewing the description of the operating of the first embodiment, so it will be reviewed only briefly herein. During the non-noise suppressing mode of operation of the engine assembly 10a (e.g. during supersonic cruise), the ambient air inlet doors 32a are both closed so as to be flush with the nacelle 11a. Thus, the only flow into the mixing chamber 80a is that of the gaseous engine exhaust. The vanes 126 are moved to the unchoked position of FIG. 15B, so that the flow of engine exhaust into the chamber 80a is subsonic. The final nozzle section 30a is operated in the convergent/divergent configuration to control the nozzle area so that gaseous flow is supersonic and the nozzle area matches engine requirements.

During the noise suppressing mode, as indicated previously, the ambient air doors 32a are opened to admit ambient air. The vanes 126 are moved inwardly to control the flow of engine exhaust at the passageway exhaust segments 56a, in order to match engine requirements. The engine exhaust and the ambient air mix in the mixing chamber 80 and flow out the final nozzle 38a, which is configured to provide an increased nozzle area.

It is obvious that various modifications could be made to the present invention without departing from the basic teachings thereof.

What is claimed

1. A supersonic jet engine assembly arranged to operate in a mixed flow, noise suppressing mode where ambient air is mixed with engine exhaust for noise suppression, and to operate in a substantially non-mixed flow mode, said assembly comprising:
   a. a nacelle having an inlet end and an outlet end;
   b. a jet engine positioned in said nacelle to receive air through said air inlet end and discharge gaseous exhaust from an outlet end of said engine;
   c. a nozzle section positioned to receive the gaseous exhaust from the engine, said nozzle section comprising:
      i. a selectively operable ambient air door means which has an open position to admit ambient air into said nozzle section, and a closed position;
      ii. a passageway mixing section comprising passageway defining wall means having an inlet portion to receive the gaseous exhaust from the engine and also to receive the ambient air through opening means provided by the ambient door means, said passageway mixing section defining a plurality of engine exhaust outlet segments and a plurality of ambient air outlet segments, interspersed with one another, with said passageway mixing section having a transition portion to direct engine exhaust into the engine exhaust outlet segments and to direct the ambient air into the ambient air discharge segments;
      iii. means defining a mixing chamber positioned downstream of said passageway mixing section to receive gaseous exhaust flow from said gaseous exhaust outlet segments and also to receive ambient air flow from the ambient air outlet segments, with mixing occurring in said mixing chamber when there is flow of both gaseous engine exhaust and ambient air into said mixing chamber;
      iv. a variable area final nozzle portion arranged to be configured in a convergent/divergent configuration to receive gaseous flow from said mixing chamber at subsonic velocity and discharge said gaseous flow at supersonic velocity, and to be configured with a greater nozzle area;
      v. engine exhaust outlet segment modulating means having
         1. a first noise suppressing modulating mode where the modulating means is positioned to provide a convergent/divergent outlet area of the engine exhaust outlet segments, and to increase and decrease the outlet area to match engine requirements during a noise suppressing mode, where ambient air is directed into said mixing chamber,
         2. a second open operating mode where the engine exhaust modulating means is positioned to permit substantially unrestricted flow from said engine exhaust outlet segments;
whereby during a non-noise suppressing mode, engine exhaust flow into said mixing area is subsonic, and said final nozzle portion is operated in said convergent/divergent configuration to cause discharge of said gaseous engine exhaust at supersonic velocities, and during the noise suppressing mode, the engine exhaust outlet segment modulating means can be operated to modulate flow through said engine exhaust outlet segments in a manner to increase and decrease outlet area at the engine exhaust outlet segments to match engine requirements, and the door means is opened to admit ambient air into the mixing chamber.

2. The engine assembly as recited in claim 1, wherein said engine exhaust outlet segment modulating means comprises a plurality of plug elements positioned at respective engine exhaust outlet segments to define with said passageway defining wall means convergent/divergent outlet areas for said engine exhaust outlet segments for said first noise suppressing modulating mode, and means to modify the relative position of said plug elements and said wall means to increase or decrease the outlet areas of the engine exhaust outlet segments and also to position said plug elements to be spaced from said engine exhaust outlet segments for said second open operating mode.

3. The assembly as recited in claim 2, wherein said plug elements are positioned to be moveable axially relative to said wall means generally along a longitudinal axis of said engine.

4. The assembly as recited in claim 2, wherein said plug elements are arranged to be moved angularly relative to said nacelle.

5. The assembly as recited in claim 4, wherein said plug elements are arranged to be moveable angularly to a stowed position at said nacelle.

6. The assembly as recited in claim 2, further comprising noise suppressing panel means positioned in said mixing chamber.

7. The assembly as recited in claim 2, wherein said assembly further comprises a plurality of noise suppressing panel means positioned in said mixing chamber, each of said panel means being positioned behind, and aligned with, a flow path of ambient air emitted downstream from said ambient air outlet segments.

8. The assembly as recited in claim 1, wherein said assembly further comprises a plurality of noise suppressing panel means positioned in said mixing chamber, each of said panel means being positioned behind, and aligned with, a flow path of ambient air emitted downstream from said ambient air outlet segments.

9. The assembly as recited in claim 1, wherein said engine exhaust outlet segment modulating means comprises a plurality of vane means, each of which is mounted adjacent to a related one of said engine exhaust outlet segments, each of said vane means having surface means defining a passageway for engine exhaust through said engine exhaust outlet segments, each of said vane means being positioned to define said convergent/divergent outlet area of the engine exhaust outlet segments and moveable to vary outlet area of said engine exhaust outlet segments.

10. The assembly as recited in claim 9, wherein each of said vane means comprises a pair of vanes positioned at a downstream end of said passageway defining wall means, with each pair of vanes being moveable toward and away from one another to vary the outlet area of said engine exhaust outlet segments, and moveable further away from one another to permit said substantially unrestricted flow from said engine exhaust outlet segments.

11. The assembly as recited in claim 1, wherein at least a rear portion of said nozzle section has a generally rectangular configuration, and said final nozzle portion comprises opposed nozzle sections, rear ends of which are moveable toward and away from one another.

12. The assembly as recited in claim 11, wherein said opposed nozzle sections have inwardly facing surface portions which are moveable to be contoured in a convergent/divergent configuration, and also moveable to further outward positions to present an increased nozzle exhaust area for said noise suppressing mode.

13. The assembly as recited in claim 11, wherein said nozzle sections are arranged to be moved toward one another to block said final nozzle, thrust reverser means positioned forwardly of said final nozzle and being operable to move to an open position to divert engine exhaust from within said nacelle outwardly and forwardly for thrust reversal.

14. A method of operating a supersonic jet engine assembly in a mixed flow, noise suppressing mode where ambient air is mixed with engine exhaust for noise suppression, and also to operate the engine in a substantially non-mixed flow mode, said method comprising:

a. operating said assembly to receive air into an inlet end of an engine assembly nacelle, direct the air to a jet engine positioned in said nacelle, and discharge gaseous exhaust from an outlet end of said engine;

b. directing said gaseous exhaust from the engine to a nozzle section positioned which receives the gaseous exhaust from the engine;

c. to operate in a noise suppressing mode, moving ambient air door means to an open position to admit ambient air into a passageway mixing section of said nozzle section, having passageway defining wall means;

d. directing the gaseous exhaust from the engine to said passageway mixing section of the nozzle section and through a plurality of engine exhaust outlet segments, and also directing the ambient air through a plurality of ambient air outlet segments, interspersed with the engine exhaust outlet segments;

e. directing the engine exhaust and the ambient air flow from said outlet segments into a mixing chamber positioned downstream of said passageway mixing section, with mixing occurring in said mixing chamber for noise suppression;

f. directing said mixed flow into a variable area final nozzle portion positioned to provide a greater nozzle area cross section to accommodate volume of the mixed flow;

g. operating engine exhaust outlet segment modulating means in a first noise suppressing modulating mode where the modulating means is positioned to provide a convergent/divergent outlet area at the engine exhaust outlet segments, and to increase and decrease the outlet area to match engine requirements during the noise suppressing mode, where ambient air is directed into said mixing chamber;

h. for the non-mixed flow mode, closing the ambient air door means to a closed position to block flow of ambient air into the nozzle section;

i. positioning said engine exhaust outlet segment modulating means in a second open operating mode where the engine exhaust modulating means is positioned to permit substantially unrestricted flow from said engine exhaust outlet segments;

j. moving the variable area final nozzle portion to a convergent/divergent configuration to receive gaseous flow from said mixing chamber at subsonic velocity and discharge said gaseous flow at supersonic velocity.

15. The method as recited in claim 14, wherein said engine exhaust outlet segment modulating means comprises a plurality of plug elements positioned at respective engine exhaust outlet segments to define with said passageway defining wall means convergent/divergent outlet areas for said engine exhaust outlet segments for said first noise suppressing modulating mode, said method comprising modifying the relative position of said plug elements and said wall means to increase or decrease the outlet areas of the engine exhaust outlet segments for the noise suppressing mode and positioning said plug elements to be spaced from said engine exhaust outlet segments for said second open operating mode.

16. The method as recited in claim 15, wherein said plug elements are moved axially relative to said wall means generally along a longitudinal axis of said engine.

17. The method as recited in claim 15, wherein said plug elements are arranged to be moved angularly relative to said nacelle to a stowed position at said nacelle.

18. The method as recited in claim 14, further comprising disposing noise suppressing panel means positioned in said mixing chamber.

19. The method as recited in claim 14, wherein said engine exhaust outlet segment modulating means comprises a plurality of vane means, each of which is mounted adjacent to a related one of said engine exhaust outlet segments, each of said vane means having surface means defining a passageway for engine exhaust through said engine exhaust outlet segments, said method comprising positioning said vane means to define said convergent/divergent outlet area of the engine exhaust outlet segments and moving the vane means to vary outlet area of said engine exhaust outlet segments.

20. The method as recited in claim 14, wherein at least a rear portion of said nozzle section has a generally rectangular configuration, and said final nozzle portion comprises opposed nozzle sections, rear ends of which are moveable toward and away from one another, said method further comprising moving said opposed nozzle sections inwardly so that facing surface portions are contoured in a convergent/divergent configuration for the second operating mode, and also moving the nozzle sections further outward to present an increased nozzle exhaust area for said noise suppressing mode.

* * * * *